(12) United States Patent
Deng et al.

(10) Patent No.: US 9,550,467 B2
(45) Date of Patent: Jan. 24, 2017

(54) TUNABLE CRASH BOLSTER

(71) Applicant: Ford Global Technologies, LLC, Dearborn, MI (US)

(72) Inventors: Zhibing Deng, Northville, MI (US); Herbert Yang, Saline, MI (US); Brian Pietila, Howell, MI (US); Banyuga Pefok, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 14/714,744

(22) Filed: May 18, 2015

(65) Prior Publication Data
US 2016/0339862 A1    Nov. 24, 2016

(51) Int. Cl.
*B60N 99/00* (2006.01)
*B60R 21/04* (2006.01)

(52) U.S. Cl.
CPC .... *B60R 21/0428* (2013.01); *B60R 2021/0414* (2013.01)

(58) Field of Classification Search
CPC .................. B60R 21/0428; B60R 2021/0414
See application file for complete search history.

(56) References Cited

U.S. PATENT DOCUMENTS

| 7,810,869 | B2 | 10/2010 | Taracko |
| 7,832,781 | B2 | 11/2010 | Deng et al. |
| 8,827,350 | B1* | 9/2014 | Deng ............... B60J 5/0451 296/146.6 |
| 2006/0154027 | A1 | 7/2006 | Dry |
| 2008/0073933 | A1 | 3/2008 | Heinze et al. |
| 2009/0256391 | A1 | 10/2009 | Hall et al. |
| 2010/0171337 | A1* | 7/2010 | Deng ............... B60J 5/0427 296/152 |

FOREIGN PATENT DOCUMENTS

| CN | 202753876 U | 2/2013 |
| DE | 2013013169 A1 | 4/2014 |
| KR | 200473221 | 7/2014 |

\* cited by examiner

*Primary Examiner* — Lori L Lyjak
(74) *Attorney, Agent, or Firm* — Frank MacKenzie; Bejin Bieneman PLC (57) ABSTRACT

An apparatus comprises a vehicle door closeout panel. The closeout panel comprises a pelvis bolster having a plurality of load points. Each load point is determined based on a respective one of a plurality of vehicle seat track positions and is configured to receive a respective load determined according to the seat track position by which the load point was determined.

20 Claims, 12 Drawing Sheets

TUNABLE CRASH BOLSTER

BACKGROUND

Vehicle door storage space is typically formed using two plastic panels: a cover panel and a closeout panel. The cover panel is visible to a vehicle occupant. Cover panel design is generally consistent with the vehicle styling theme. The closeout panel has a portion behind the cover panel which is not visible to occupants. This portion and the cover panel often form a storage space. A side impact pelvis bolster is also often packaged in the same area. Current designs do not provide optimal pelvis bolster configurations while minimizing limitations on available storage space.

DESCRIPTION

Figure 1:
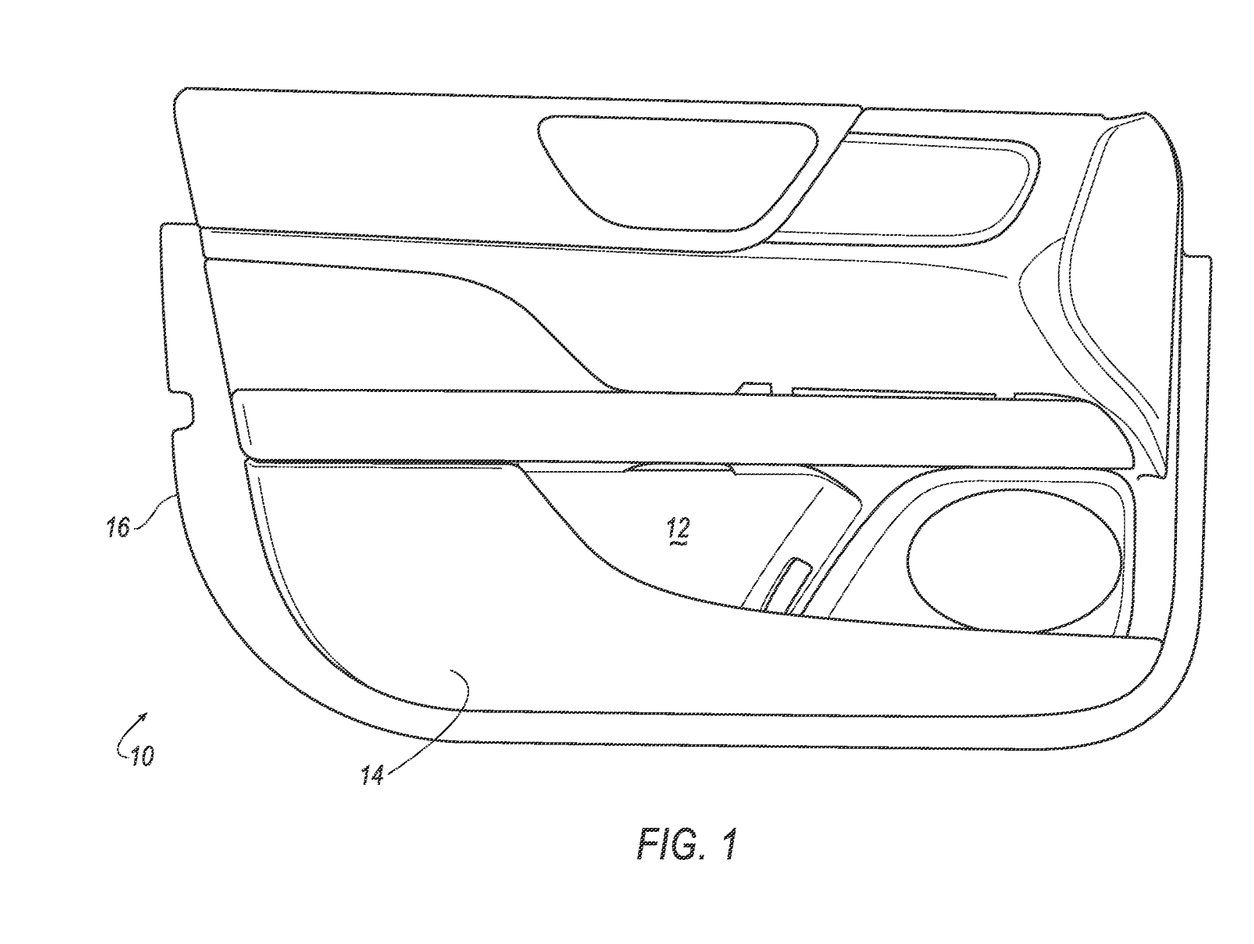
FIG. 1 provides a perspective view of an exemplary vehicle safety system including a tunable pelvis bolster.
Figure 2:
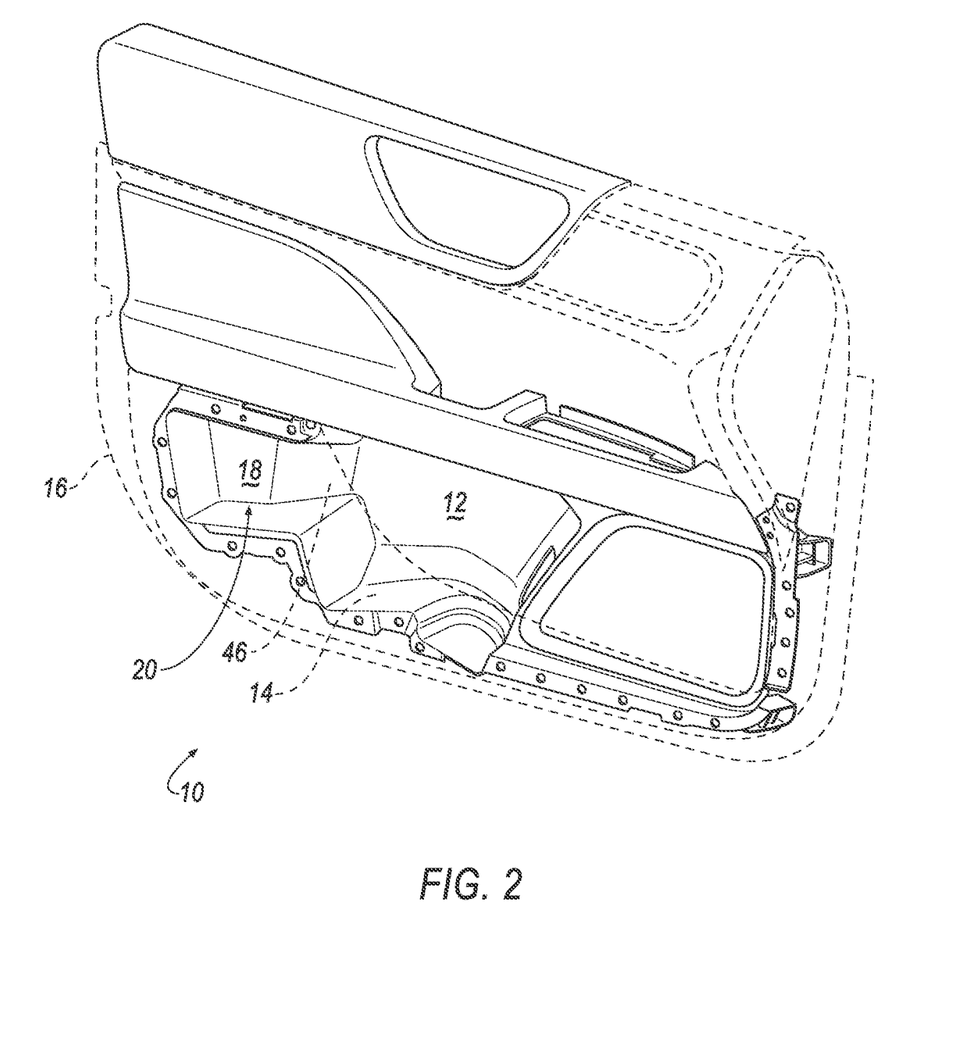
FIG. 2 provides a perspective view of the exemplary vehicle safety system of FIG. 1, with a cover panel shown in transparency to allow more complete illustration of a closeout panel.
Figure 3A:
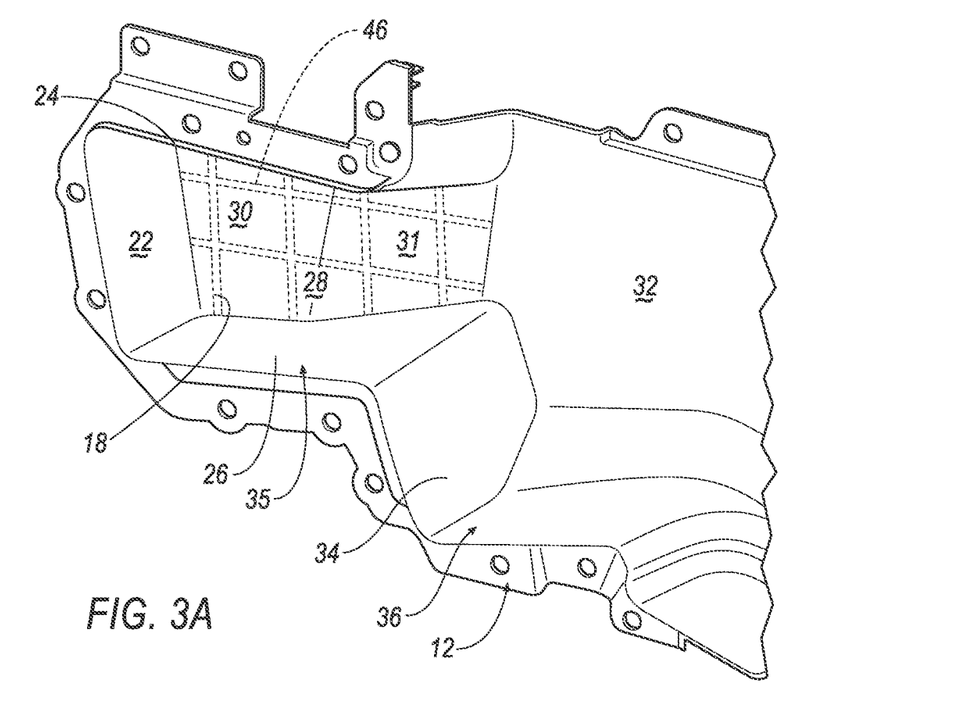
FIGS. 3A and 3B provide front and rear perspective views, respectively, of an exemplary closeout panel of the system of FIG. 1.
Figure 3B:
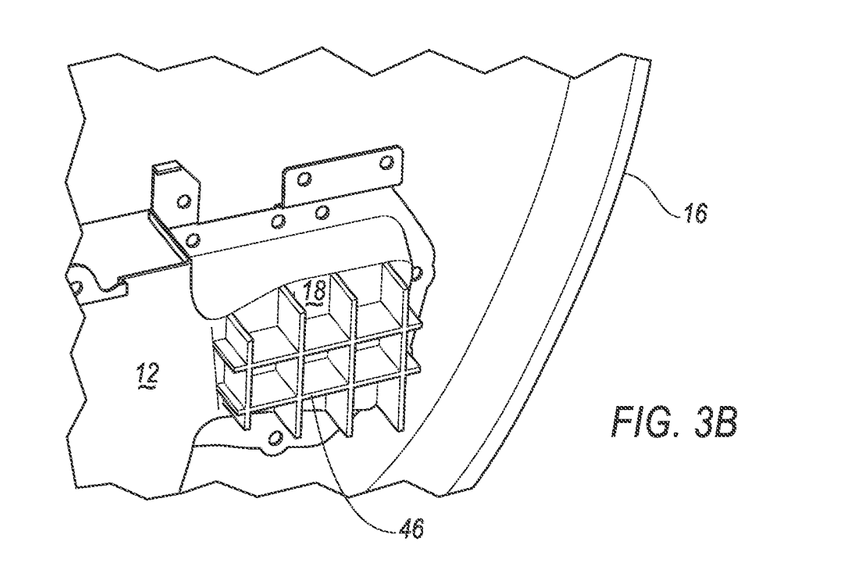

With reference to FIGS. 1-3, a vehicle safety system 10 includes a closeout panel 12 and a cover panel 14 mateable to one another, and mountable to a vehicle door (not shown). The cover panel 14 generally faces an interior of a vehicle, and forms part of a vehicle interior trim and appearance, including door trim 16. A portion of the closeout panel 12 may also be visible within a vehicle interior, as will be apparent from the drawings. The closeout panel 12 includes a pelvis booster 18. When the closeout panel 12 and cover panel 14 are mated and mounted on a door, a storage space 20 is formed, at least part of the storage space 20 generally being adjacent to the pelvis bolster 18.

The closeout panel 12 generally comprises in a rearward portion 35 of the pelvis bolster 18; joined to which is a forward portion 36 (e.g., the rearward portion 35 and the forward portion 36 are generally a single piece of molded plastic, other illustrated parts of the panel 12 possible being formed therewith as illustrated herein). The pelvis bolster 18 may have a generally rectilinear shape, e.g., as seen in the present figures; note that corners and/or edges of the pelvis bolster 18 may be rounded, tiered, and/or chamfered, e.g., as described below. As best seen in FIG. 3A, the pelvis bolster 18 is formed as part of the closeout panel 12 with a back wall 22, an upper wall 24, a lower wall 26, and a forward wall 34. The pelvis bolster 18 is further generally formed with portions 30, 31 of a closeout panel 12 vertical wall 28. The forward portion 36 of the closeout panel 12 includes a third portion 32 of the vertical wall 28. Each of the panel 12 wall portions 30, 31, and 32 is substantially planar in the example of FIG. 3A, and the portions 30 and 32 are connected by the portion 31, which forms a first obtuse angle with the portion 30, and a second obtuse angle with the portion 32. Note that the wall 28 is referred to as a "vertical" wall for convenience, and because the wall 28 is generally, although not necessarily, closer to a vertical plane than any other wall of the closeout panel 12. However, the wall 28, as should be clear, is not necessarily vertical or even substantially vertical; the wall 28 may also be referred to as a "side" wall 28. The bolster 18 may further include, extending between one or more sets of two of the walls 22, 24, 26, and 34, and generally extending substantially perpendicularly from the portions 30 and/or 31, one or more reinforcing ribs 46 (see FIG. 3B).

Figure 4:
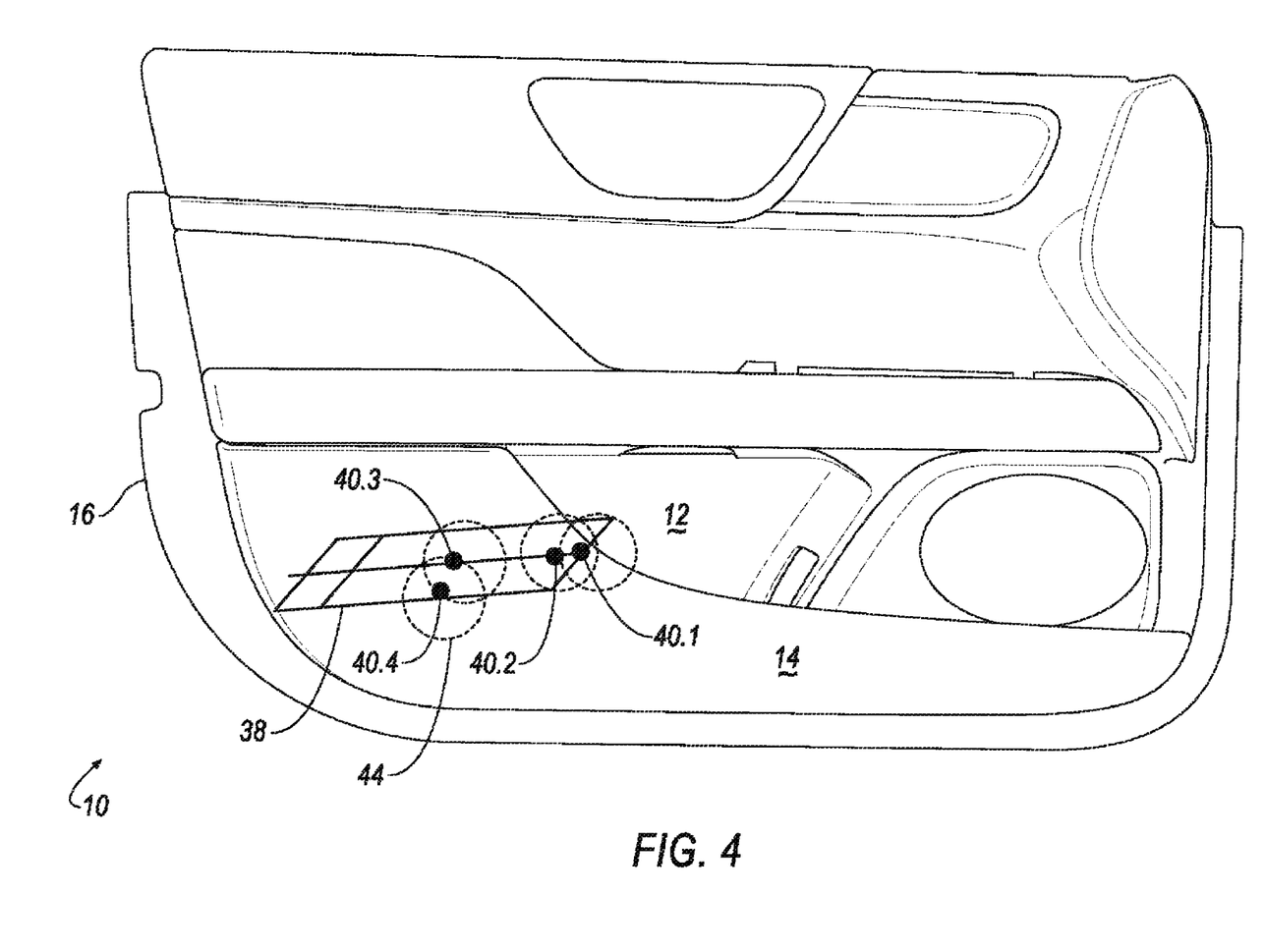
FIG. 4 provides a perspective view of the exemplary vehicle safety system of FIG. 1 including a tunable pelvis bolster with a seat track map, and impact map, and load points overlaid thereon.
Figure 5:
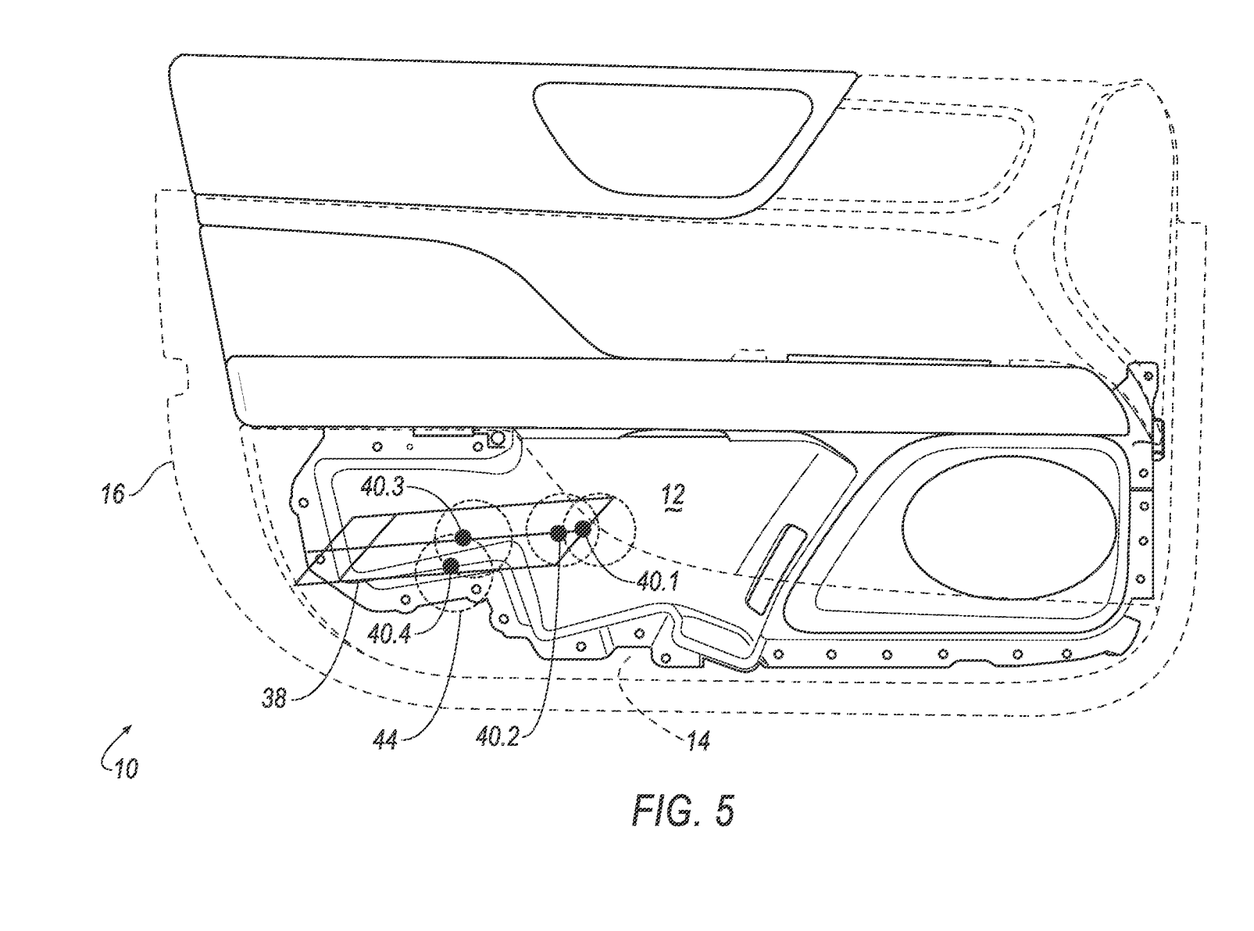
FIG. 5 provides the perspective view of FIG. 4, with the modification of showing the cover panel in transparency.

As seen in FIGS. 4 and 5, a plurality of load points 40.1, 40.2, 40.3, 40.4, etc. (collectively referred to herein for convenience as load points 40) may be determined for the pelvis bolster 18. The load points 40 are defined with respect to X and Z axes in the present example; each of the load points 40 is further defined to be located on a Y plane, i.e., to have a y-axis value of zero, or no y-axis value. Thus, the load point 40.1 has coordinates $(x_1, z_1)$, 40.2 has coordinates $(x_2, z_2)$, 40.3 has coordinates $(x_3, z_3)$, and 40.4 has coordinates $(x_4, z_4)$.

Each load point 40 may be determined based on a respective one of a plurality of vehicle seat track positions, possible seat track positions, e.g. locations of a bottom or horizontal portion of a vehicle seat that are possible according to movement mechanisms provided for the vehicle seat, being illustrated in a seat track map 38. The bolster 18 can then be configured to receive various loads at each of the load points 40 according to a seat track position by which the load point 40 was determined. For example, based on an impact map 44 showing potential impact locations of an occupant's pelvis on the cover panel 14 in the event of a vehicle crash, load points 40 may be identified. Note that load points 40 may depend on results of a simulation for parameters that include a particular vehicle type, model, build, etc., and/or occupant characteristics such as percentile weight, percentile height, etc. Accordingly, as described further below, a size, shape, and/or other characteristics of the bolster 18 may be said to be tunable according to various input parameters such as the foregoing.

Figure 6:
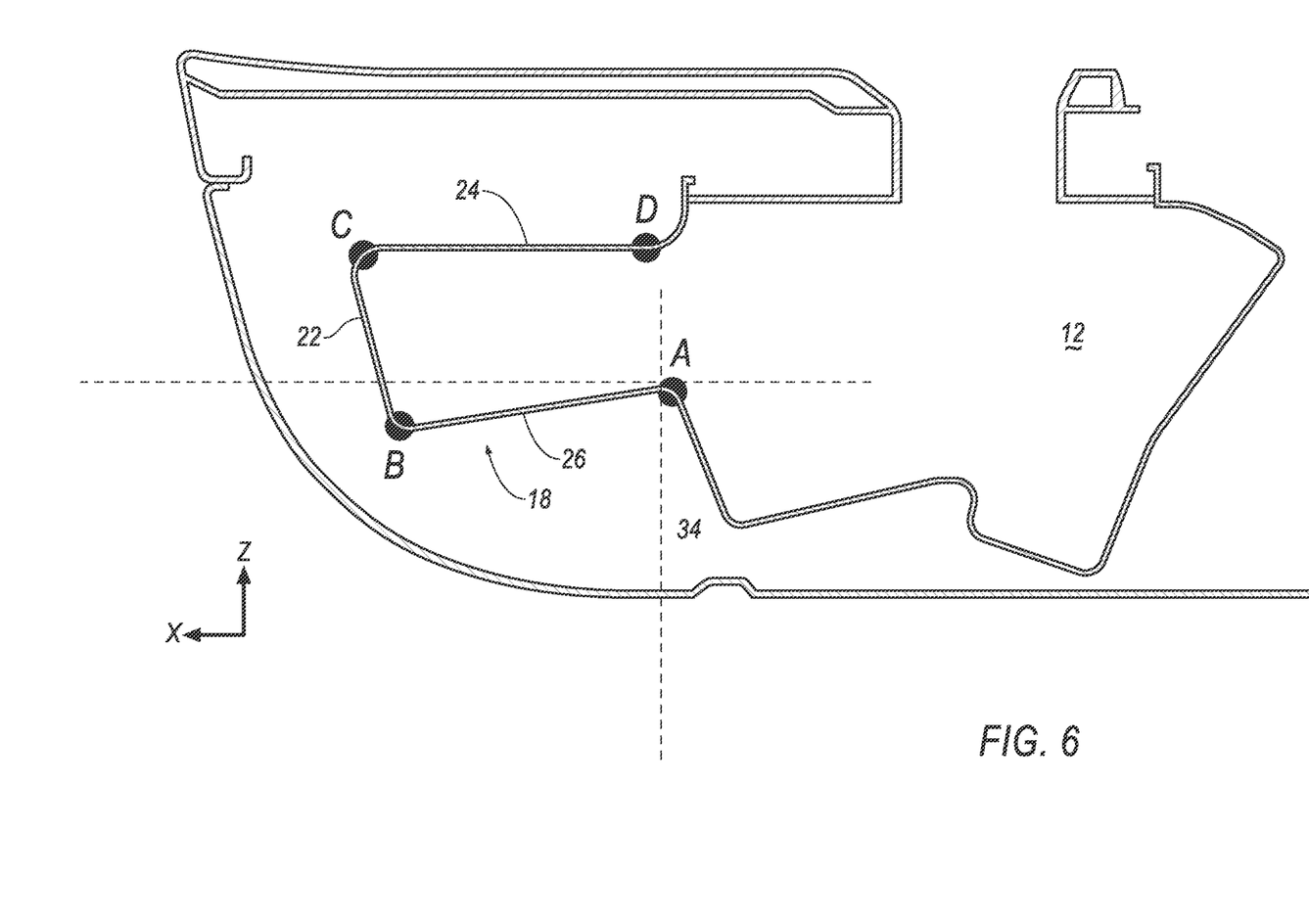
FIG. 6 is a side cross-sectional view of an exemplary closeout panel including a pelvis bolster.

FIG. 6 and Table 1 below provide an example of using tuning parameters to obtain load points 40, and determine a configuration of certain elements of the bolster 18, in this case, corners A, B, C, D, as well as angles ϕ and ω. The corners $A(x_A, z_A)$, $B(x_B, z_B)$, $C(x_C, z_D)$, and $D(x_D, z_D)$, and the angles ϕ and ω, may be referred to as structural parameters inasmuch as they at least partly define a structure, in this case boundaries, i.e., a shape, of the bolster 18. Likewise, corners A, B, C, and D are examples of "boundary points," i.e., points that at least partly define a shape or boundary of the bolster 18. Other examples of structural parameters are provided below; in general, a structural parameter of the bolster 18 according to the present disclosure is a value defining a geometry, e.g., size, shape, wall thickness, etc., of the bolster 18.

FIG. 6 provides a cross-sectional view of the closeout panel 12 including the bolster 18, the section being taken along a Y-plane according to the coordinate system described above. In this example, the Y-plane is defined by edges of the wall 30, i.e., locations where the wall 30 joins walls 22, 24, and 26 of the closeout panel 12. In this example, the angle ϕ is defined between the lower wall 26 of the bolster 18 and a horizontal plane (e.g., the X-plane in the exemplary three-dimensional coordinate system), while the angle ω is defined between the forward wall 34 of the bolster 18 and a vertical plane (e.g., the Z-plane).

TABLE 1

| Feature | Design Values | Nominal Values | Tuning Values |
| --- | --- | --- | --- |
| Corner A | $x_A = \min(x_3, x_4) - L_A$ | $\min(x_3, x_4)$ | $0 \leq L_A \leq 75$ |
|  | $z_A = z_2 + H_A$ | $z_2$ | $0 \leq H_A \leq 25$ |
| Corner B | $x_B = x_2 + L_B$ | $x_2 + 130$ | $0 \leq L_B$ |
|  | $z_B = z_2 + H_B$ | $z_2 + 40$ | $H_B \leq 0$ |
| Corner C | $x_C = x_2 + L_C$ | $x_2 + 150$ | $0 \leq L_C$ |
|  | $z_C = z_1 + H_C$ | $z_1 + 40$ | $0 \leq H_C$ |
| Corner D | No constraint | No constraint | No constraint |
|  | $z_D = z_1 + H_D$ | $z_1 + 80$ | $0 \leq H_D$ |
| Angle ϕ | $20 + \Delta_\phi$ | 20 | $-30 \leq \Delta_\phi \leq 20$ |
| Angle ω | $20 + \Delta_\omega$ | 20 | No constraint |

As illustrated in Table 1, various features of the bolster 18 (the examples of Table 1 being illustrated in FIG. 6) may be designed, i.e., may have "Design Values," according to various "Tuning Values," e.g. a longitudinal length L and a vertical height H of the bolster 18. Also provided are "Nominal Values," i.e., starting or default values for the respective features, i.e., values that will be applied as design values if respective tuning values are zero or not specified. Values in Table 1 are specified in millimeters, except that values relating to the angles are provided in degrees. In general, nominal values are specified to locate the bolster 18 in an area where it may receive pelvic impacts in a crash. Tuning values are provided according to space available for adjusting the nominal values to obtain design values. That is, a range of tuning values is provided according to practically possible design values, e.g., possible dimensions, for placing the bolster 18 given the door on which the closeout panel 12 is to be installed, as well as a range of values for the bolster 18 to accommodate a range of possible load points 40 on a cover panel 14, e.g., determined according to pelvis sizes and shapes of potential occupants of the vehicle seat. Possible sizes and shapes of the bolster 18, i.e., possible dimensions thereof, may be determined according to packaging requirements for a particular vehicle make, model, etc., e.g., in the context of a door and/or cover panel 14. To mention just one example of a tuning value shown in Table 1, a value $L_A$ may be used within a specified range to determine a coordinate value $x_A$ for a bolster 18 corner A.

Tuning values allow for selection of various tunable structural parameters, e.g., boundary points, angles of inclination or declination of bolster 18 walls from vertical and/or horizontal planes, as discussed in the above example. Accordingly, one or more structural parameters may be selected to provide a bolster 18 such that respective load points 40 are configured to receive the loads determined according to the respective seat track positions by which the load points were determined.

Figure 7:
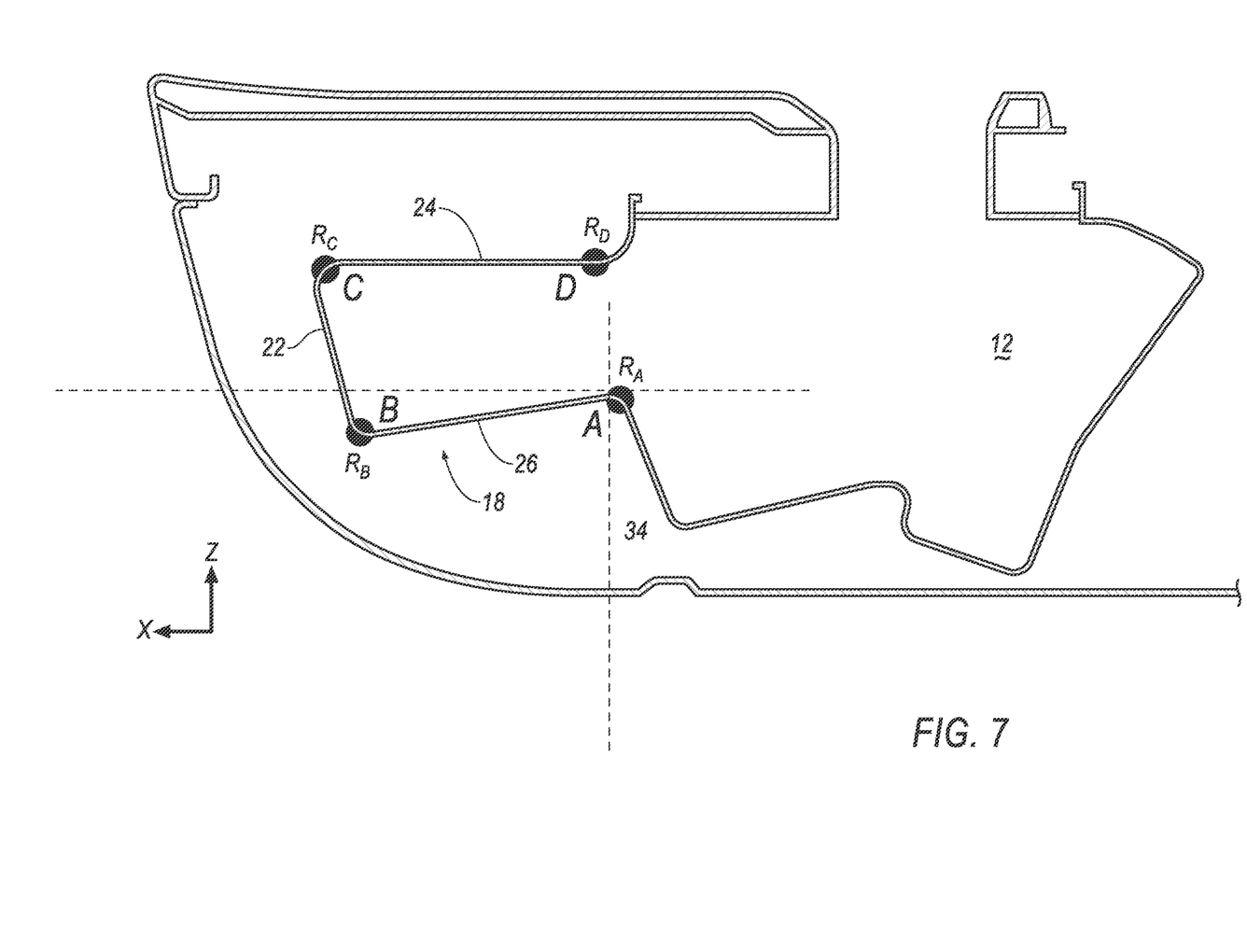
FIG. 7 is a side cross-sectional view of another exemplary closeout panel including a pelvis bolster.

Other structural parameters may be determined according to various tuning values. For example, FIG. 7 illustrates that, in addition, or as an alternative, to corners A, B, C, and D, discussed above, being tunable parameters, a radius of a curvature of such corners, e.g., one or more respective radii $R_A$, $R_B$, $R_C$, and $R_D$, may likewise be tunable.

Figure 8:
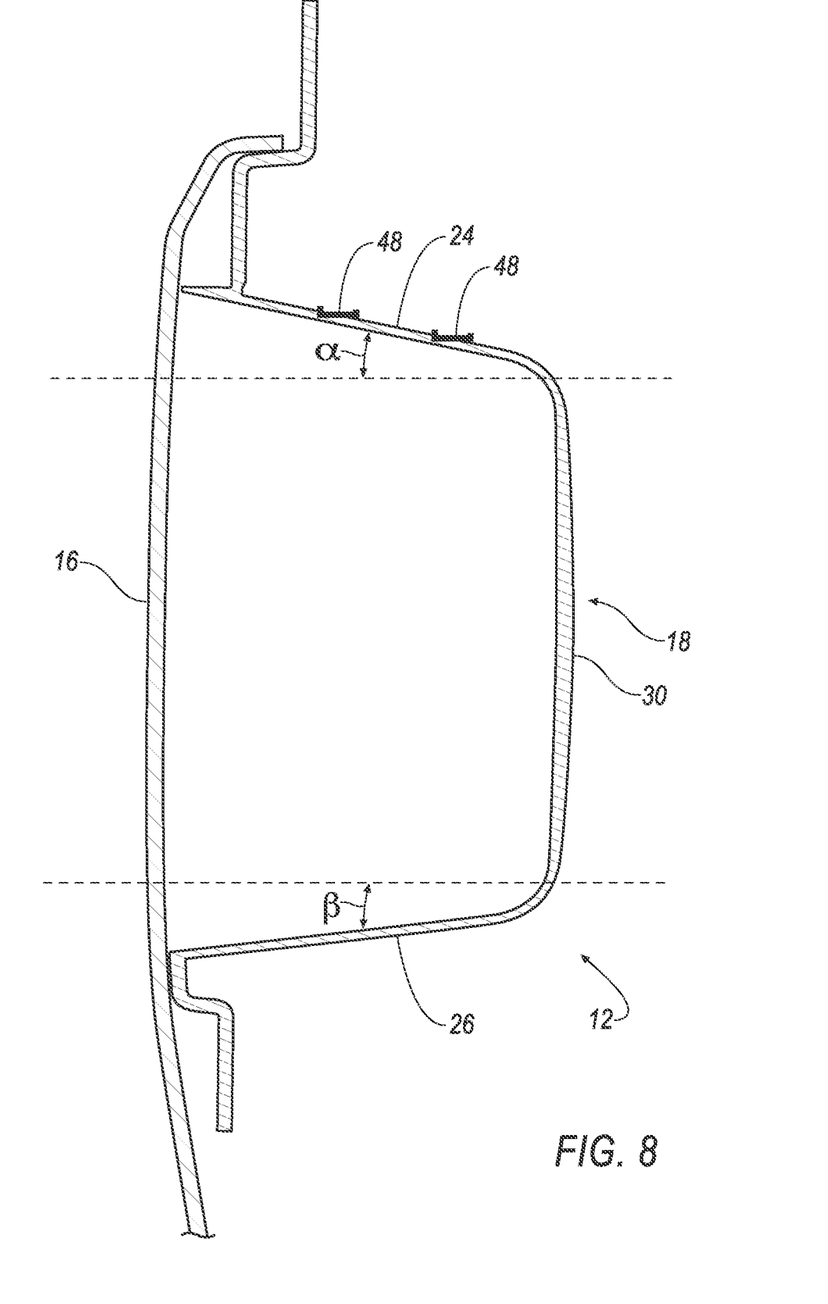
FIG. 8 is a front cross-sectional view of another exemplary closeout panel including a pelvis bolster.

FIG. 8 illustrates additional angles α and β that may be tuned, these angle representing a deviation from a horizontal plane of the upper wall 24, and the lower wall 26, respectively. FIG. 8 further illustrates softening notches 48, i.e., one or more divots or notches 48 may be formed in a side, e.g., the wall 24, of the bolster 18 to reduce a force or load that can be applied before the bolster 18 collapses.

Figure 9:
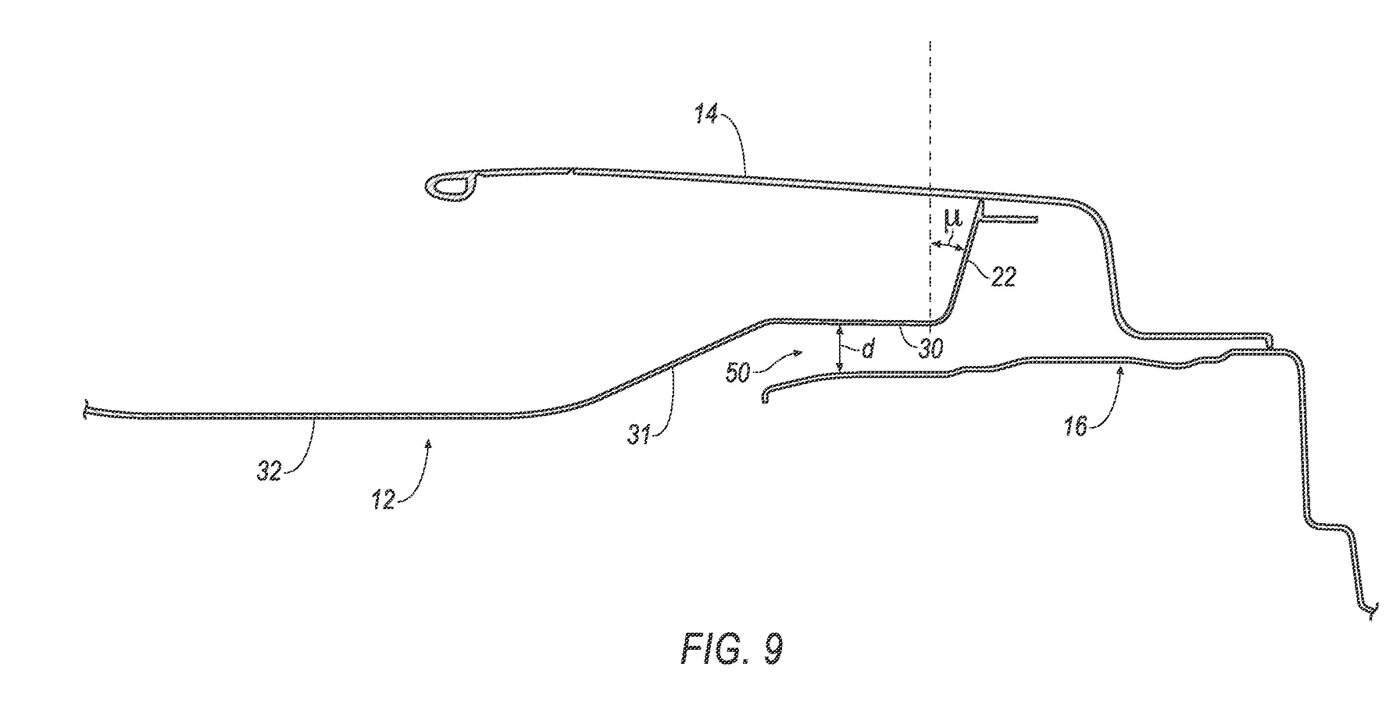
FIG. 9 is a top cross-sectional view of another exemplary closeout panel including a pelvis bolster.

FIG. 9 illustrates yet further possible tunable structural parameters of the bolster 18, including a gap 50 defined by a distance d between sheet metal of a door and a surface, e.g., the wall 30, of the bolster 18. FIG. 9 also illustrates an angle μ which is a tunable parameter measuring a deviation from a vertical plane of the bolster 18 rear wall 22.

Figure 10:
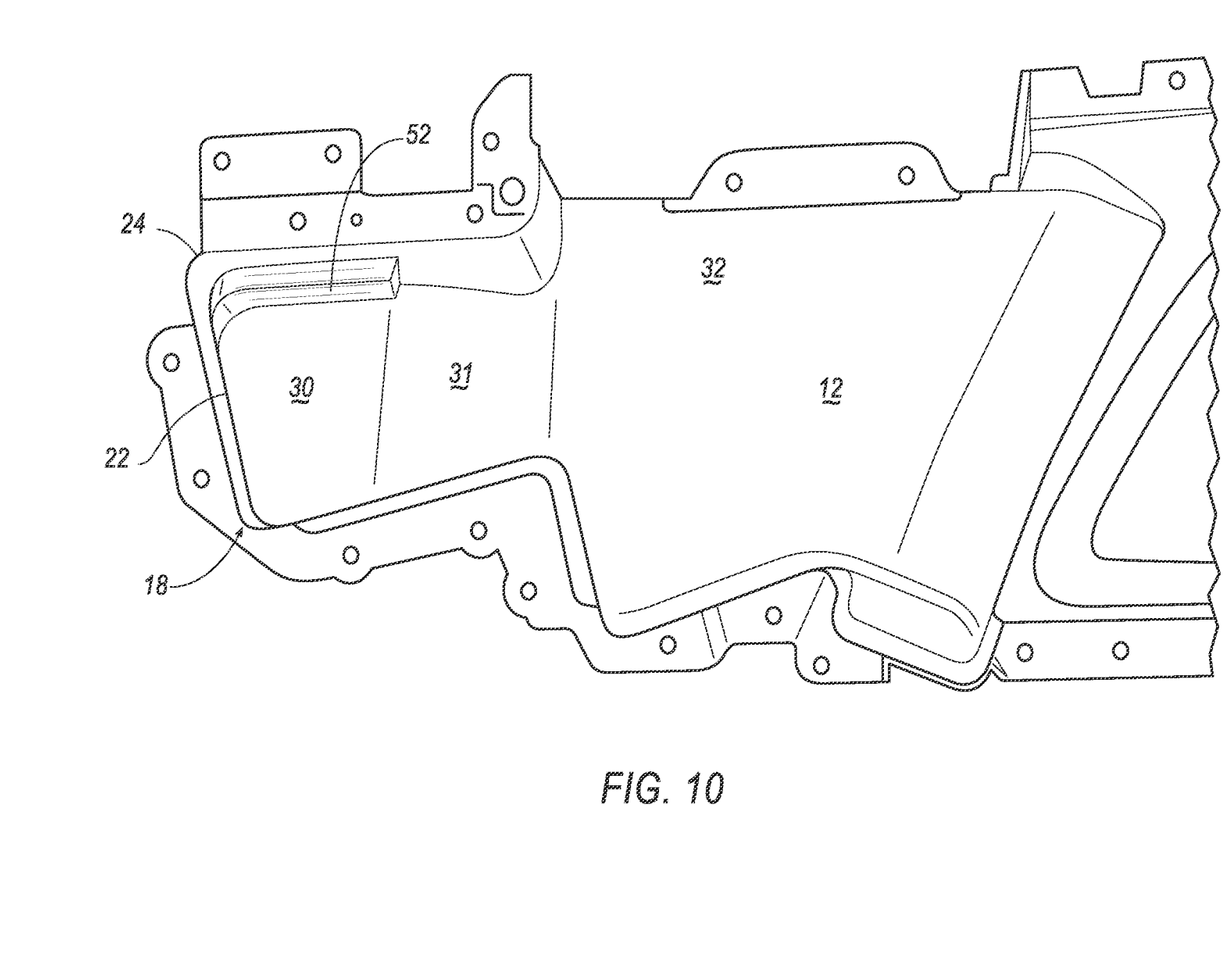
FIG. 10 is a perspective view of another exemplary closeout panel including a pelvis bolster.
Figure 11:
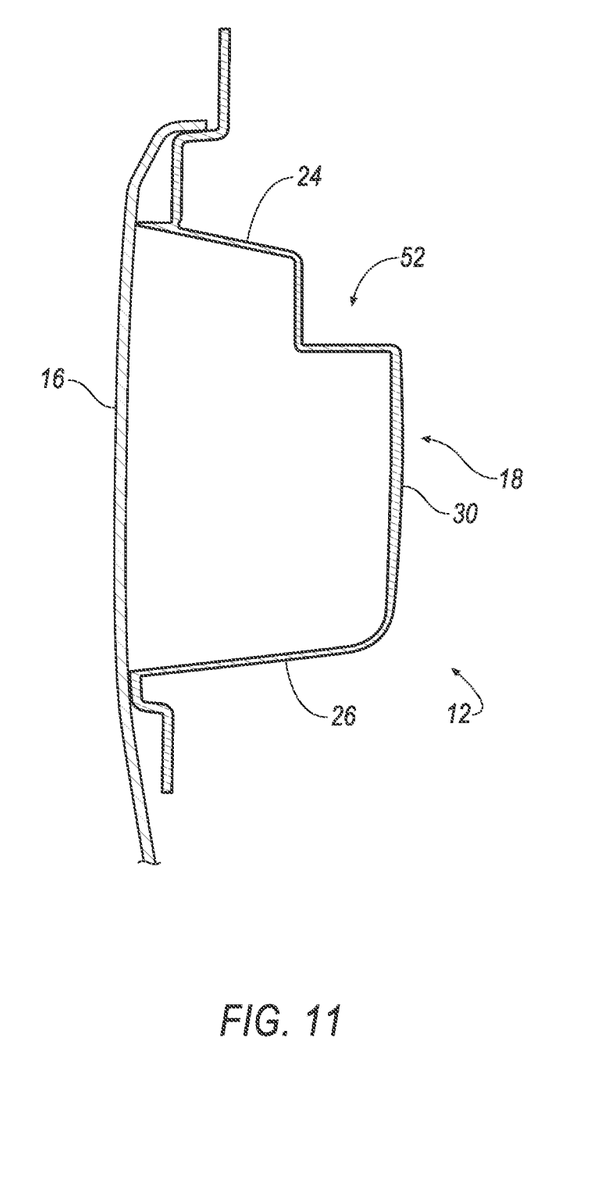
FIG. 11 is a sectional view of the closeout panel including a pelvis bolster of FIG. 10.

FIG. 10 illustrates yet further possible tunable structural parameters of the bolster 18, including steps or tiers 52 provided on at least a portion of the top wall 24. FIG. 11 shows a cross-section of the bolster 18 shown in FIG. 10. Steps or tiers 52 are another mechanism by which a load absorbable by the bolster 18 before it collapses may be controlled. That is, steps or tiers 52 as shown in FIGS. 10 and 11 may be provided to reduce such load.

Figure 12:
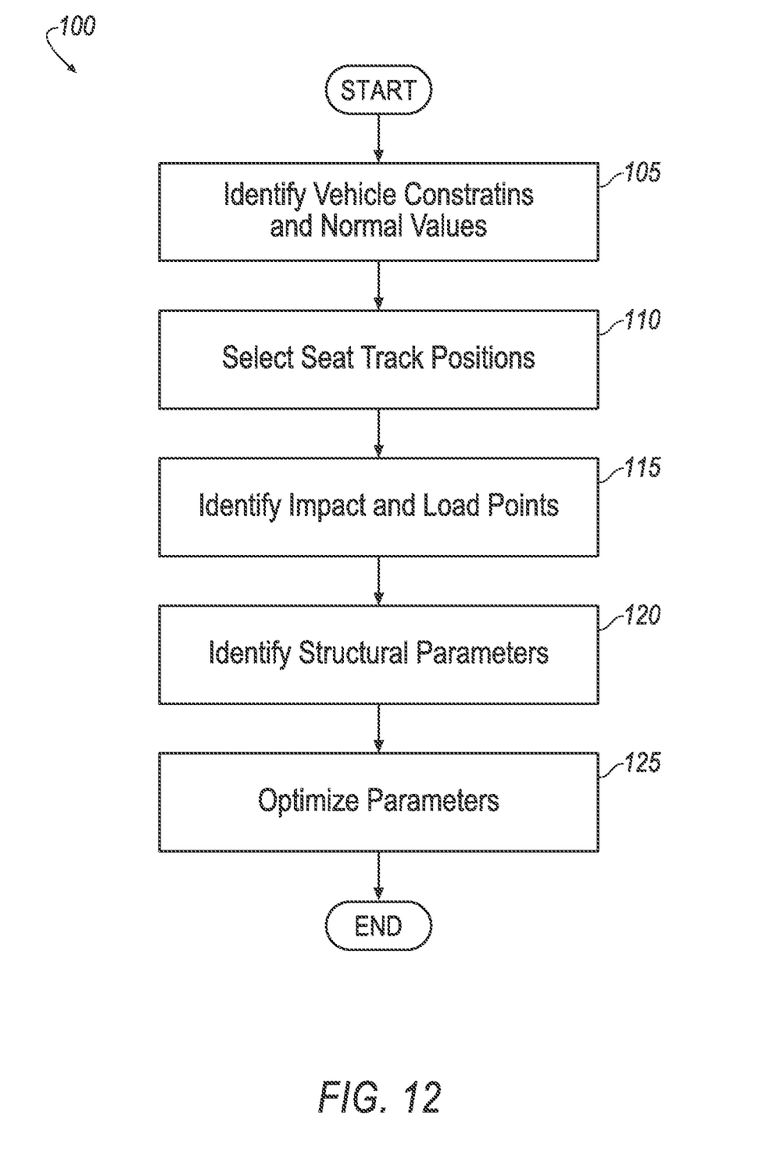
FIG. 12 illustrates an exemplary process for obtaining tunable structural parameters for a pelvis bolster.

FIG. 12 illustrates an exemplary process 100 for obtaining tunable structural parameters for a pelvis bolster. The process 100 begins in a block 105, in which constraints and nominal values for implementation of a pelvis bolster 18 in a particular vehicle, e.g., make, model, trim level, etc., are determined.

Next, in a block 110, seat track positions at which an impact map 44 should be made are determined.

Next, in a block 115, load points are identified for the seat track positions selected in the block 110, and simulation data is used to provide loads at those impact points, thereby identifying load points 40 and generating the impact map 44.

Next, in a block 120, tunable structural parameters for the bolster 18 are identified, e.g., one or more of the parameters described above.

Next, in a block 125, the structural parameters identified in the block 120 are optimized. That is, values are assigned to the parameters starting from the nominal values, and within the constraints, identified in the block 105 such that load points 40 will collapse at a load based on an impact force specified in the simulation data of the block 115. Accordingly, the bolster 18 advantageously provides optimized energy absorption upon impact of an occupant's pelvis against the cover panel 14 and/or closeout panel 12 during a crash. That is, the bolster 18 is configured to collapse upon receiving a load at each of the points 40 that is optimized to provide energy absorption upon a pelvic impact.

Following the block 125, the process 100 ends.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising a vehicle door closeout panel that comprises:
    a pelvis bolster having a plurality of load points, each load point being determined based on a respective one of a plurality of vehicle seat track positions and configured to receive a respective load determined according to the seat track position by which the load point was determined.

2. The apparatus of claim 1, further comprising a vehicle door cover panel that is mateable to the closeout panel to form at least a portion of a storage space.

3. The apparatus of claim 1, further comprising a vehicle door cover panel that is mateable to the closeout panel to cover the pelvis bolster.

4. The apparatus of claim 1, wherein the pelvis bolster includes a plurality of structural parameters, each of the parameters being selected to provide the load points that are configured to receive the loads determined according to the respective seat track positions by which the load points were determined.

5. The apparatus of claim 4, wherein the pelvis bolster includes each of an upper wall, a back wall, a lower wall, and a side wall extending therefrom.

6. The apparatus of claim 4, wherein the structural parameters include boundary points that are each located where two of the walls meet.

7. The apparatus of claim 6, wherein an angle of at least one of the walls to at least one of a horizontal plane and a vertical plane is used to determine at least one of the boundary points.

8. The apparatus of claim 6, wherein the side wall includes a first portion and a second portion that are at an obtuse angle with respect to one another.

9. The apparatus of claim 4, wherein the pelvis bolster includes reinforcing ribs extending laterally from the side wall.

10. The apparatus of claim 1, wherein the apparatus is installed in a vehicle.

11. A method, comprising:
    selecting a plurality of vehicle seat track positions;
    determining desired loads for a pelvis bolster, each of the desired loads respectively associated with one of the seat track positions; and
    providing a vehicle door closeout panel including a pelvis bolster having a plurality of load points, each of the load points being configured to receive one of the loads.

12. The method of claim 11, further comprising mating a vehicle door cover panel to the closeout panel to form at least a portion of a storage space.

13. The method of claim 11, further comprising mating a vehicle door cover panel to the closeout panel to cover the pelvis bolster.

14. The method of claim 11, further comprising selecting a plurality of structural parameters, each of the parameters being selected to provide the load points that are configured to receive the loads determined according to the respective seat track positions by which the load points were determined.

15. The method of claim 14, wherein the pelvis bolster includes each of an upper wall, a back wall, a lower wall, and a side wall extending therefrom.

16. The method of claim 14, wherein the structural parameters include boundary points that are each located where two of the walls meet.

17. The method of claim 16, wherein an angle of at least one of the walls to at least one of a horizontal plane and a vertical plane is used to determine at least one of the boundary points.

18. The method of claim 16, wherein the side wall includes a first portion and a second portion that are at an obtuse angle with respect to one another.

19. The method of claim 16, wherein the pelvis bolster includes reinforcing ribs extending laterally from the side wall.

20. The method of claim 16, further comprising installing the closeout panel in a vehicle.

* * * * *